March 5, 1968 R. C. HOFFMAN ET AL 3,371,883

TAPE REWIND

Filed Jan. 10, 1966 5 Sheets-Sheet 1

Inventors:
Robert C. Hoffman
Raymond M. Faber
Gradolph Love & Rogers
attorneys

TAPE REWIND

Filed Jan. 10, 1966

Inventors:
Robert C. Hoffman
Raymond M. Faber
Gradolph Love & Rogers
Attorneys

TAPE REWIND

Inventors:
Robert C. Hoffman
Raymond M. Faber
Gradolph Love & Rogers
Attorneys

March 5, 1968 R. C. HOFFMAN ET AL 3,371,883

TAPE REWIND

Filed Jan. 10, 1966 5 Sheets-Sheet 4

Inventors:
Robert C. Hoffman
Raymond M. Faber
Gradolph Love & Rogers
Attorneys

March 5, 1968 R. C. HOFFMAN ET AL 3,371,883

TAPE REWIND

Filed Jan. 10, 1966 5 Sheets-Sheet 5

Inventors:
Robert C. Hoffman
Raymond M. Faber
Gradolph Love & Rogers
attorneys

United States Patent Office 3,371,883

Patented Mar. 5, 1968

3,371,883
TAPE REWIND

Robert C. Hoffman, Park Ridge, and Raymond M. Faber, Chicago, Ill., assignors to Victor Comptometer Corporation, Chicago, Ill., a corporation of Illinois Filed Jan. 10, 1966, Ser. No. 519,779
11 Claims. (Cl. 242—67.3)

The present invention relates to improvement in tape rewind mechanisms.

Certain types of business machines, such as cash registers, have tape printers which record all of the transactions entered into and performed by the machines. The tapes are removed from the machines at specified intervals frequently at shift or pricing changes, so that the accounting department can utilize the recorded information for business purposes.

The permanent tapes must be reasonably accessible for removal. The spools or arbors on which they are wound must be driven so that the tape is advanced through the machine at a rate synchronized with the remaining machine actions.

It is a principal object of the present invention to provide a new and improved tape rewind mechanism including an arbor on which the tape is wound into a roll and which is axially movable to free itself from the roll.

Another object is to provide an arbor provided with projecting fingers on which the tape is wound, the fingers being retractible to free the roll of tape for removal.

Another object is to provide a tape rewind mechanism including an axially movable arbor having projecting but retractible fingers with means for retracting the fingers upon withdrawing movement of the arbor from the tape roll wound thereon.

Other objects and advantages will become apparent from the following description taken in conjunction with the accompanying drawings wherein.

Figures 1, 8:
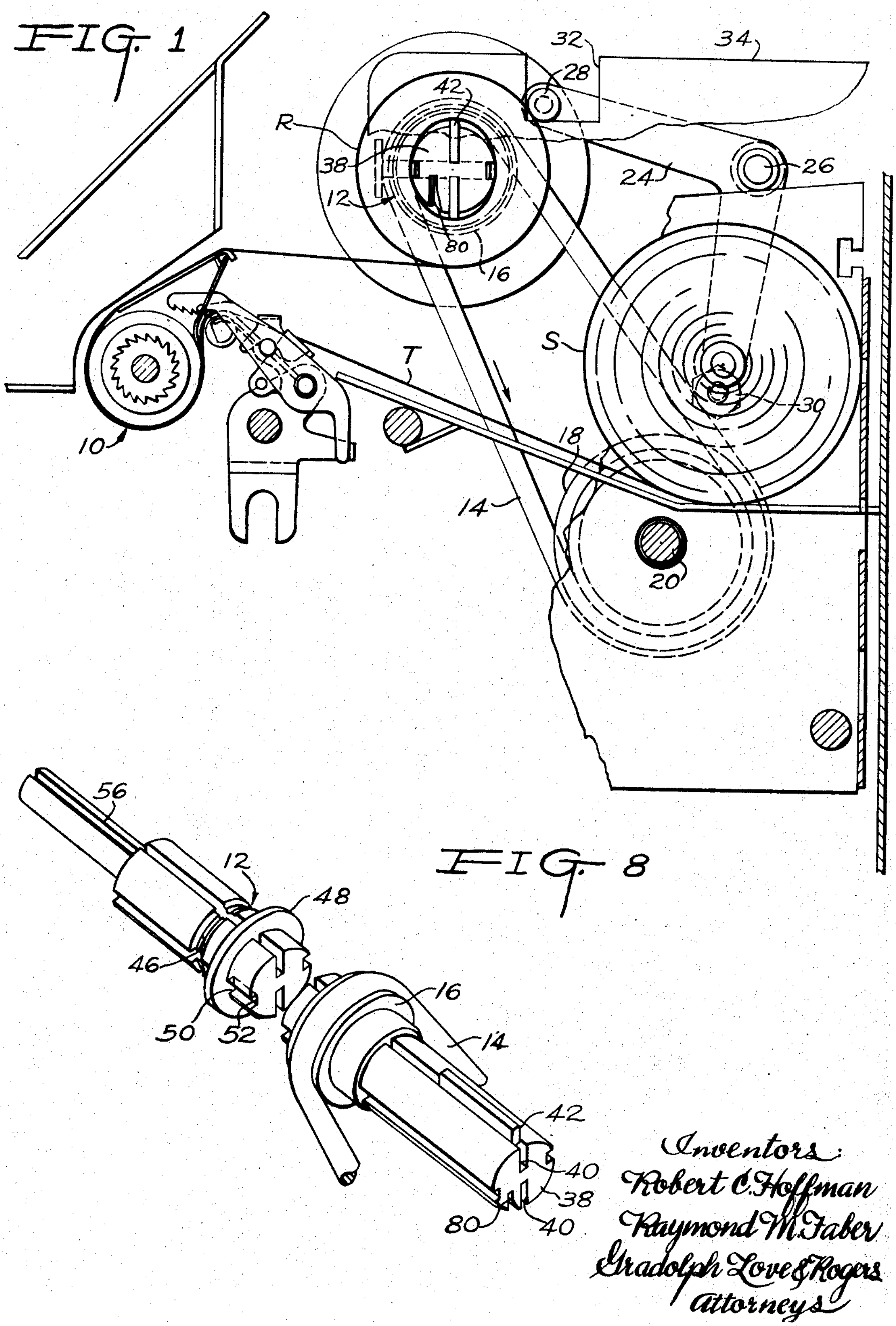
FIG. 1 is a partly schematic elevational view from an end of the tape rewind mechanism showing the supply roll, a part of the printing mechanism of a calculator or cash register, the rewind mechanism of the present invention, and the drive therefor.
FIG. 8 is a perspective view of the functioning parts of the rewind mechanism.
Figure 2:
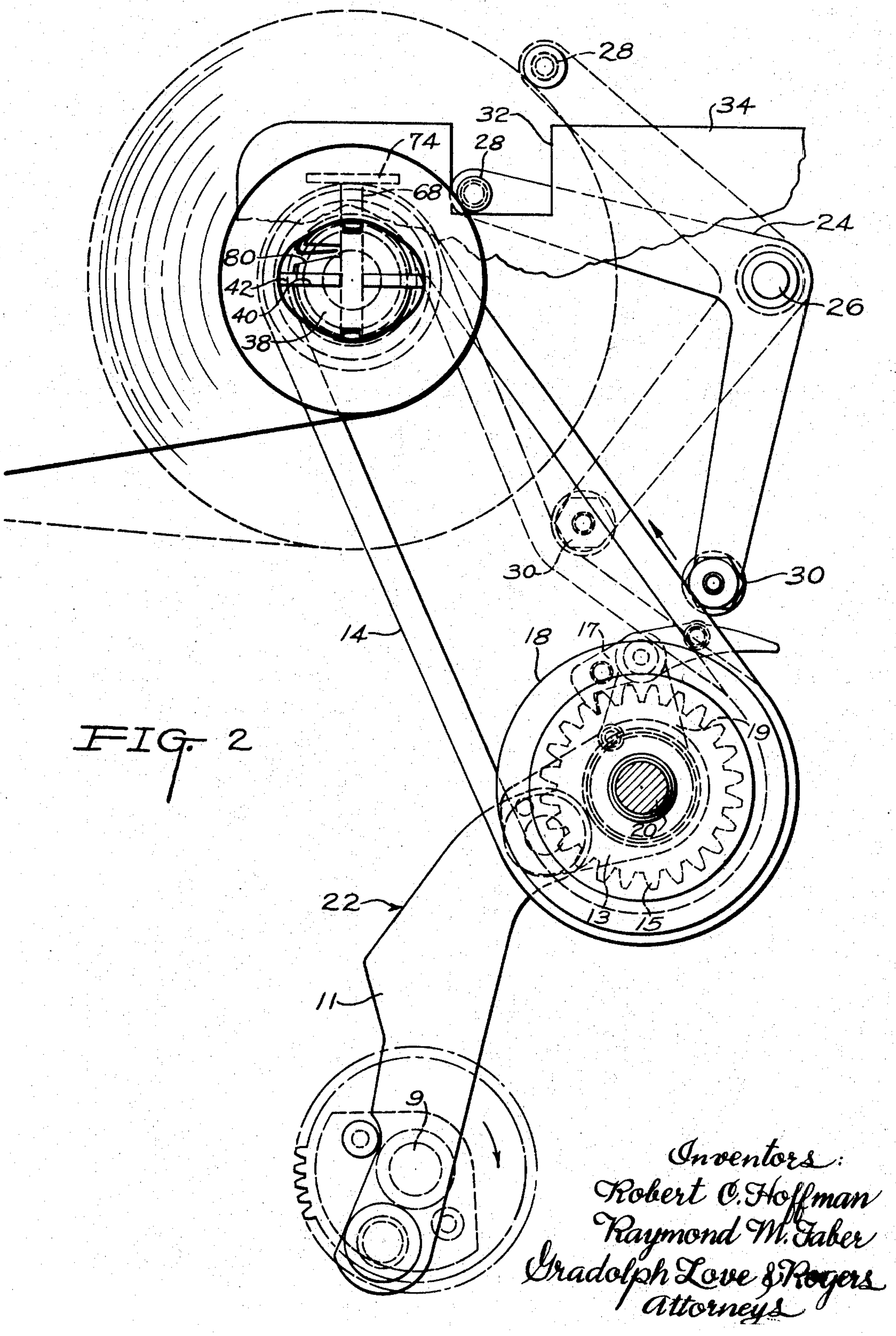
FIG. 2 is a view similar to FIG. 1 which shows the rewind mechanism of the present invention and the power drive therefor.
Figure 3:
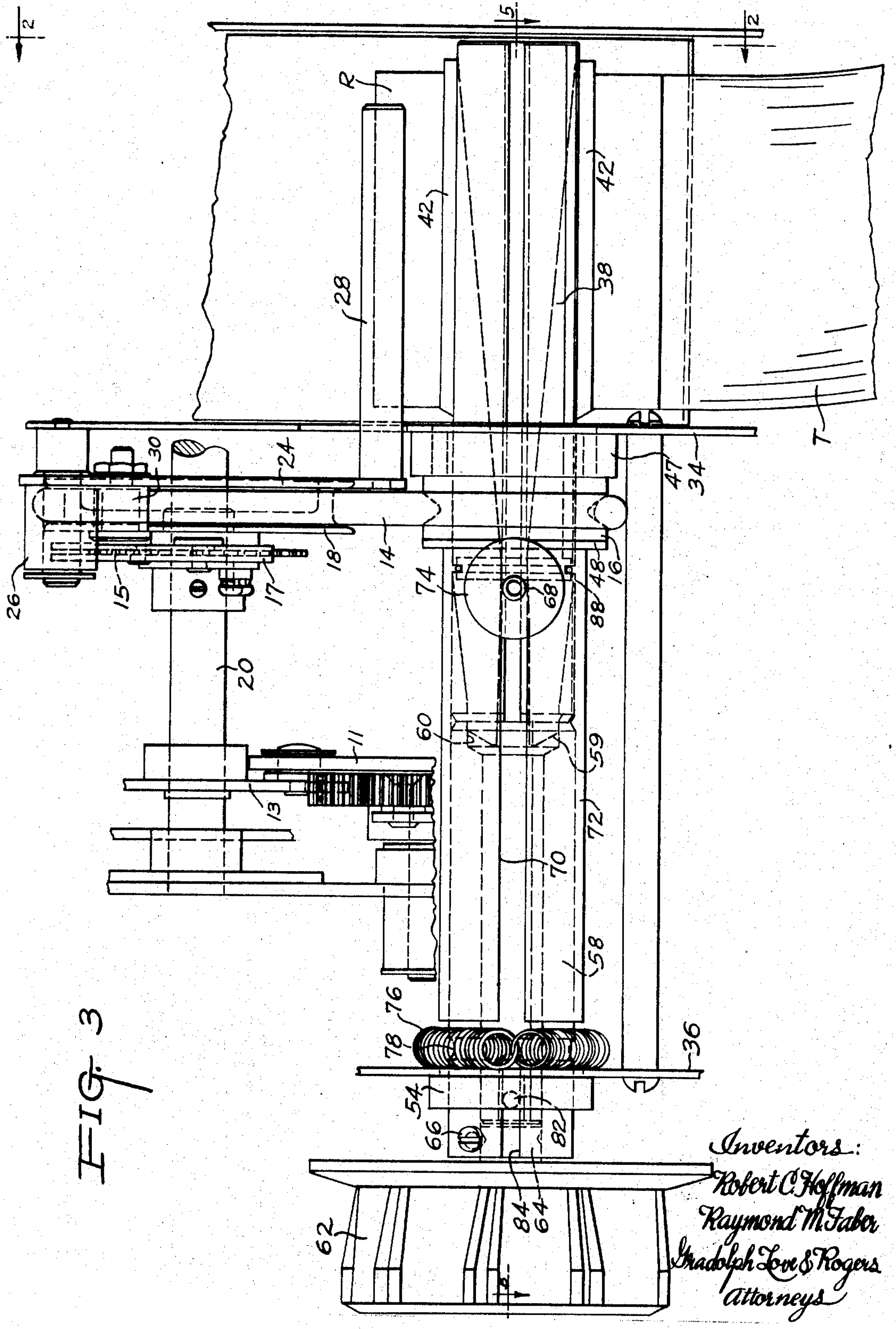
FIG. 3 is a top elevational view of the rewind mechanism in winding position.

FIGS. 1, 2 and 3 show in general the cash register machine environment of the present invention. A supply roll S of sheet material or paper tape is rotatably mounted so that a web or tape T may be drawn therefrom and advanced past a printing mechanism indicated generally by reference character 10, and then wound upon the mandrel of the present invention which is indicated generally by reference character 12. The tape T is wound on the mandrel 12 and forms a roll R to provide a record of the computations made on the machine.

The mandrel 12 is rotated incrementally by means including a round belt 14 which is trained around pulleys 16 and 18. The pulley 18 is mounted on a shaft 20 and incrementally advanced by a drive mechanism 22 thereby transmitting like rotation of the mandrel 12 to provide for incremental advance of the tape T past the printing mechanism previously referred to.

The drive mechanism 22 is of a known type and includes a shaft 9 driven by a one revolution clutch of the type shown in James G. Woodier Patent No. 2,995,227, dated Aug. 8, 1961. The shaft 9 makes one revolution for each machine cycle and is connected through a pair of crank arms 11 and 13 to oscillate the shaft 20 through an angle of about 98° 50′. A ratchet wheel 15 is freely mounted on the shaft and the pulley 18 is connected thereto to be driven thereby. The ratchet wheel 15 is driven by a pawl 17 in the counterclockwise direction. The pawl 17 is pivotally mounted on the outer end of an arm 19 fixed on the shaft 20 and its nose is spring biased into engagement with the teeth of the ratchet wheel 15 to drive it in the counterclockwise direction.

The belt is a friction drive on the pulleys 16 and 18 and as the size of the roll R is increased there is increasing resistance to the drive of the tape and an increase in slippage. A bell crank 24 which is pivoted at 26 on the frame has rollers 28 and 30 at its opposite ends bearing respectively against the roll R and the belt 14. As the size of the roll R increases beyond a certain predetermined point, the roller 28 engages the roll and the bell crank 24 is rotated in the clockwise direction to press on the belt 14 as shown in dotted lines to increase the frictional grip of the belt and to reduce the potential slippage. When the takeup roll R is relatively small, there is no need for this action and notch 32 in frame member 34 provides a rest position for the bell crank 24.

The mandrel 12 is journaled on the frame plate 34 and a second frame plate 36 and is slidable axially relative thereto. The mandrel 12 comprises an arbor 38 which normally projects in cantilevered fashion beyond the frame plate 34. Slots 40 extend lengthwise of the arbor 38 and receive respectively a pair of finger plates 42. A split ring 44 is received by a circumferential groove formed in the arbor 38 and is also received by notches 46 in the finger plates 42 to maintain the latter in fixed position lengthwise of the arbor 38.

The pulley 16 is journaled in a bearing 47 carried by the frame plate 34 and held in fixed axial position relative thereto. A washer 48 is secured to the pulley 16 and has inwardly extending lugs 50 which are received by lengthwise grooves 52 in the arbor 38 to transmit movement from the belt 14 to the arbor 38. The grooves 52 permit arbor 38 to be shifted axially of the washer 48 and pulley 16.

A bushing 54 is provided in the plate 36 to slidably and rotatably mount the opposite end of the mandrel 12. It will be seen that the arbor 38 has, at its left hand end, an extension 56 of reduced diameter which is slidably received in a hollow shaft 58. The inner ends of the finger plates 42 are formed with camming faces 59, extend a short distance along the mandrel extension 56 and are normally received in a recess 60 in the end of the shaft 58. This arrangement cams the opposite ends of the finger plates outwardly to the illustrated position of FIG. 5 wherein they hold the roll R in place on the mandrel 12.

A knob 62 is provided for manually rotating and axially shifting the mandrel 12. A stub shaft 64 projects from the knob 62, is inserted into the hollow shaft 58 and secured thereto by a set screw 66. A pin 82 projects from the arbor extension 56 into a slot 84 formed in the hollow shaft 58 to transmit rotation of the knob 62 to the arbor 38 and to permit limited axial movement therebetween.

Figure 4:
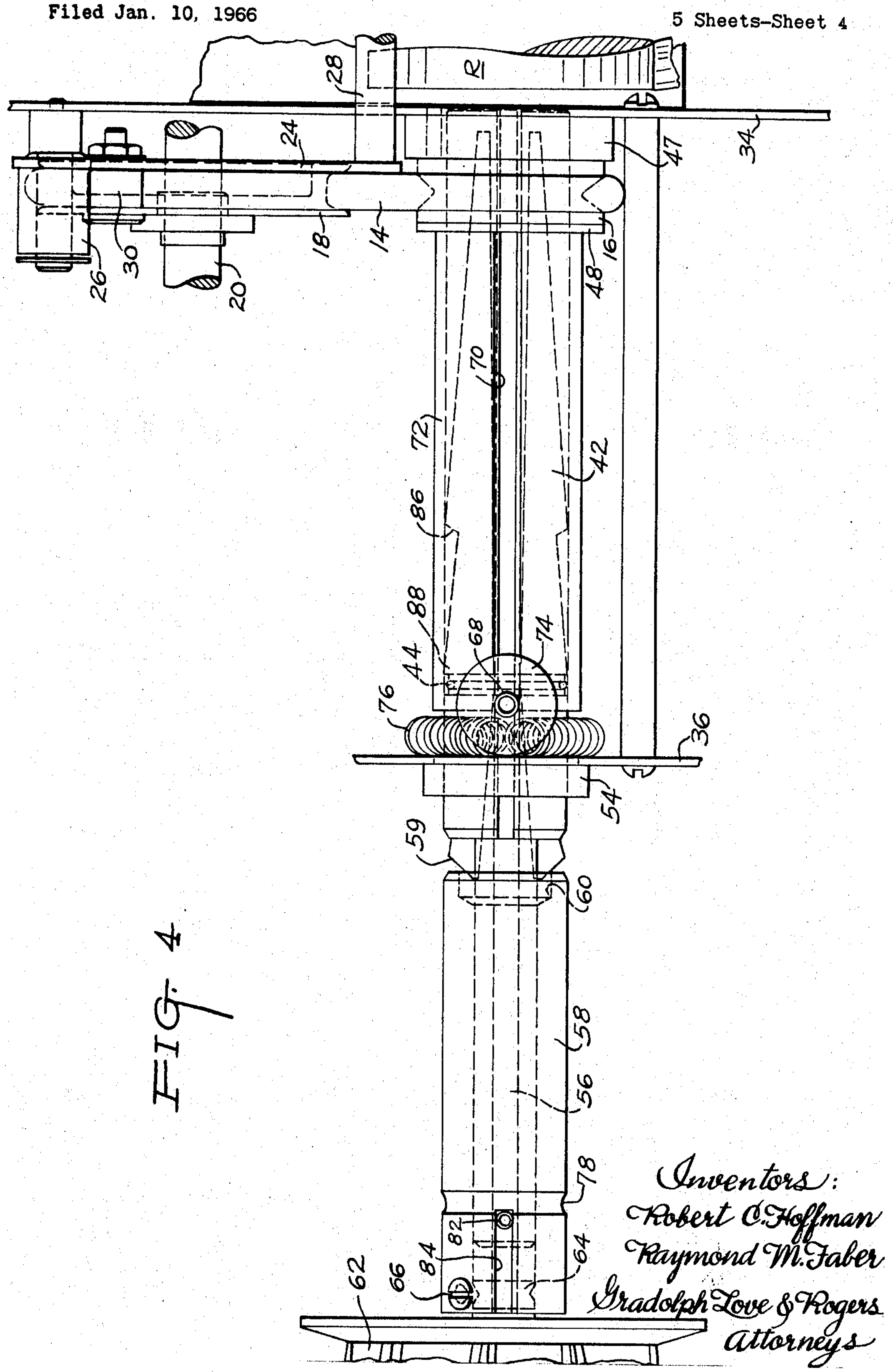
FIG. 4 is a view similar to FIG. 3 with the rewind mechanism in tape roll removal position.
Figures 5, 6, 7:
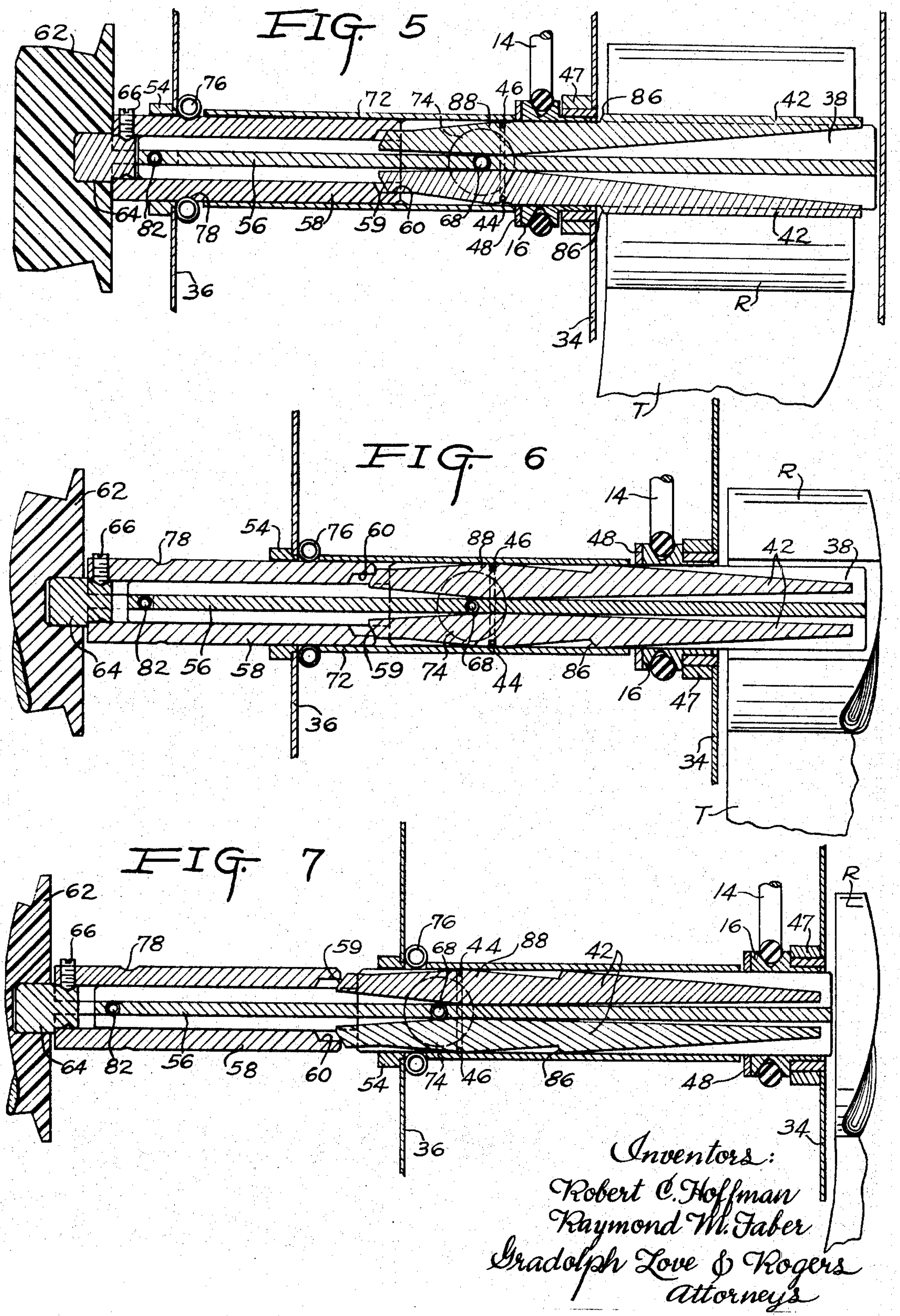
FIGS. 5 to 7 are longitudinal sectional views of the rewind mechanism showing progressive positions as the the arbor is removed from the tape roll.

A cross pin 68 (FIGS. 1 to 3) extends laterally of the inner end of the arbor 38 through a slot 70 formed in a sleeve 72 surrounding a portion of the arbor 38 and the hollow shaft 58. The slot 70 accommodates the arbor movement from FIG. 5 to FIG. 7. A garter spring 76 releasably received by a groove 78 in the shaft 58 maintains the mandrel 12 in the winding position in which the roll R is wound thereon. The cross pin 68 is fitted with a positioning roller 74 which normally engages the outer face of the washer. It provides a sensible stop not detectable by the garter spring 76 engaging in the groove 78 when the arbor 38 is returned to winding position by pushing inwardly on the knob 62. The roller or head 74 also limits the extent to which the arbor may be pulled outwardly when it contacts the frame member 36 (FIGS. 4 and 7).

The mandrel 12 is employed to wind the tape T thereon to form the roll R. Intially the tape T is inserted into a slot 80 (FIGS. 1 and 2) formed on the outer end of the arbor 38. The mandrel may then be manually rotated by an operator employing the knob 62 to wind a few turns of the tape T therearound. The protruding finger plates 42 in combination with the slot 80 insure that the leading end of the tape T is properly secured to the mandrel 12 so that the cash register may be employed in the usual fashion until the roll R has reached a maximum diameter. When such event occurs, it is then desired to remove the roll R.

To this end the described mechanism provides means for shifting the finger plates 42 radially inwardly of the arbor 38 so that the roll R will then be loosely mounted thereon and the arbor 38 can readily be retracted in an axial sense withdrawing it from the center of the roll R and permitting the completed roll to be lifted in a radial sense from the machine.

To these ends it will be seen that the pin 82 provides a lost motion connection between the shaft 58 and the arbor extension 56 permitting the hollow shaft 58 to be moved axially to the extent allowed by slot 84. Finger plates 42 (FIG. 5) have abutment edges 86 which are engageable with the frame plate 34. The spacing of these abutment edges is such that as the knob 62 is pulled axially toward the left, the hollow shaft 58 slides relative to the arbor 38, displacing the shaft recess 60 from the inner camming ends of the finger plates 42. Approximately at this time, and as illustrated in FIG. 6, the abutments 86 of the fingers 42 have cammed these fingers inwardly as the pin 82 engages the end of the slot 84 and a direct axial pull is therefore exerted on the arbor 38. It will be seen that the lower or inner surfaces of the finger plates 42 are provided with fulcrum points 88 about which these fingers pivot against the inner surface of the sleeve 72 as they are cammed by the abutment edges 86 engaging the frame plate 34.

Continued movement of the knob 62 enables the arbor 38 to be withdrawn from the roll R readily and easily as the pressure provided by the finger plates has been removed upon their retraction.

In reverse fashion, once the arbor 38 has been retracted to the position shown in FIGS. 4 and 7, the roll R removed, the knob 62 can again be displaced towards the right, placing the arbor 38 in position for winding a further length of the tape T thereon to form a second roll R. Again the leading end of the tape T would be inserted in the slot 80 and the knob 62 rotated to initially secure the leading end of the tape thereto.

From the foregoing it will be appreciated that the objectives which were claimed for the tape rewind mechanism of the present invention are attained by the disclosed structure.

While a preferred embodiment of the invention has been shown and described, it will be apparent that numerous modifications and variations thereof may be made therein without departing from the underlying principles of the invention. It is therefore desired, by the following claims, to include within the scope of the invention all such variations and modifications by which substantially the results of the invention may be obtained through the use of substantially the same or equivalent means.

What is claimed as new and desired to be secured by United States Letters Patent is:

1. A driven tape rewind mechanism for a business machine comprising in combination, a rotatable mandrel on which the tape is wound, means rotatably supporting said mandrel, said mandrel having a first porition on which the tape is wound, said first portion being radially slotted, finger plates movably mounted in said slots to project therefrom so as to be engaged and gripped by the tape being wound on said first mandrel portion, a hollow shaft arranged coaxially with said mandrel and having a camming means in the end thereof adjacent said mandrel, said finger plates having camming surfaces adapted to be engaged with said shaft camming means to project said finger plates outwardly to tape engaging position, said mandrel having a lost motion connection with said hollow shaft to permit axial lost motion therebetween sufficient to engage and disengage said shaft camming means and said camming surfaces, and a means slidably enclosing the adjacent ends of said hollow shaft, said mandrel, and said finger plates.

2. The combination set forth in claim 1, including a driving member keyed to said mandrel so as to permit axial movement of said mandrel relative to said driving member.

3. The combination set forth in claim 2, wherein said driving member is of the friction type, and including means sensitive to size of the roll being wound to increase the friction on said driving member.

4. The combination set forth in claim 3, wherein said driving member is a pulley over which is trained a driving belt, and said means sensitive to the size of the roll being wound is a bell crank having one end adapted to be moved by the roll as it increases in size and the other end pressing against said belt.

5. A driven tape rewind mechanism for a business machine comprising in combination, a rotatable mandrel assembly, a pair of spaced bearings rotatably supporting said assembly, a mandrel element having a first portion on which the tape is wound, said first portion being radially slotted, fulcrumed finger plates movably mounted in said slots to project therefrom to be engaged and gripped by the tape being wound on said first mandrel portion, a hollow shaft arranged coaxially with said first mandrel portion and having a recess in the end thereof adjacent said first mandrel portion, said finger plates having camming surfaces adapted to be engaged in said recess to project said finger plates outwardly to tape engaging position, said mandrel element having an extension projecting into said shaft, a lost motion connection between said hollow shaft and said mandrel extension permitting axial lost motion therebetween sufficient to engage and disengage said recess and said camming surfaces, and a sleeve slidably enclosing the adjacent ends of said hollow shaft, said first mandrel portion, and said finger plates.

6. The combination set forth in claim 5, wherein said sleeve is positioned between said bearings and is restrained against longitudinal movement.

7. The combination set forth in claim 6, wherein said sleeve has a longitudinal slot therein, and a stop element carried by said first mandrel portion projects through said slot to abut against fixed parts of the machine to limit the longitudinal movement of said first mandrel portion.

8. The combination set forth in claim 5, including a driving member keyed to said first mandrel portion so as to permit axial movement of said first mandrel portion relative to said driving member.

9. The combination set forth in claim 5, including means restraining said first mandrel portion and said finger plates against relative longitudinal movement.

10. The combination set forth in claim 9, including fulcruming means on said finger plates engageable with the interior wall of said sleeve to permit rocking movement of said plates in said slots.

11. The combination set forth in claim 10, including camming abutment means on said plates engageable with a fixed part of the machine as said first mandrel portion is withdrawn from the core of the wound roll to rock said plates to withdraw them into said slots and to disengage them from said roll.

References Cited

UNITED STATES PATENTS

| | | | |
|---|---|---|---|
| 2,306,466 | 12/1942 | Patterson | 242—67.1 |
| 3,052,420 | 9/1962 | Roberts | 242—72.1 X |
| 3,278,132 | 10/1966 | Camras et al. | 242—68.3 |

WILLIAM S. BURDEN, *Primary Examiner.*